(12) United States Patent
Rendl

(10) Patent No.: US 12,385,885 B2
(45) Date of Patent: *Aug. 12, 2025

(54) STATE DETERMINATION OF A FLUIDIC SYSTEM

(71) Applicant: DIONEX SOFTRON GMBH, Gemering (DE)

(72) Inventor: Martin Rendl, Munich (DE)

(73) Assignee: Dionex Softron GmbH, Gemering (DE)

( * ) Notice: Subject to any disclaimer, the term of this patent is extended or adjusted under 35 U.S.C. 154(b) by 207 days.

This patent is subject to a terminal disclaimer.

(21) Appl. No.: 18/146,491

(22) Filed: Dec. 27, 2022

(65) Prior Publication Data

US 2023/0137952 A1 May 4, 2023

Related U.S. Application Data

(63) Continuation of application No. 16/921,425, filed on Jul. 6, 2020, now Pat. No. 11,567,042.

(30) Foreign Application Priority Data

Jul. 5, 2019 (DE) ...................... 10 2019 118 205.0

(51) Int. Cl.
G01N 30/32 (2006.01)
G01M 3/26 (2006.01)
(Continued)

(52) U.S. Cl.
CPC ............ *G01N 30/32* (2013.01); *G01M 3/26* (2013.01); *G01N 30/38* (2013.01); *G01N 30/62* (2013.01);
(Continued)

(58) Field of Classification Search
CPC ............ G01N 30/32; G01N 2030/027; G01N 2030/324; G01N 2030/025; G01N 30/24; G01N 30/30; G01N 30/40; G01N 30/86; G01N 35/1016; G01N 2030/326; G01N 30/12; G01N 30/16; G01N 30/20; G01N 30/26; G01N 30/36; G01N 30/64; G01N 30/78; G01N 30/8675; G01N 35/1004; G01N 1/14; G01N 2030/342;
(Continued)

(56) References Cited

U.S. PATENT DOCUMENTS 7,027,935 B2    4/2006  Shimase et al.
7,278,329 B2 *  10/2007 Weissgerber .......... G01N 30/36
                                                   73/865.8

(Continued)

FOREIGN PATENT DOCUMENTS

DE    11 2005 001 172 T5    7/2008
DE       102016121512 A1    5/2018
(Continued)

*Primary Examiner* — Kristina M Deherrera
*Assistant Examiner* — Gedeon M Kidanu

(57) ABSTRACT

A method for determining a state of a fluidic system can include measuring back pressures in the fluidic system at different times and determining a state of the fluidic system. The determination is based on at least the measured back pressures and on additional status information indicative of at least one status of the fluidic system at at least one of the different times.

24 Claims, 4 Drawing Sheets

(51) Int. Cl.
*G01N 30/02* (2006.01)
*G01N 30/38* (2006.01)
*G01N 30/62* (2006.01)
*G01N 30/86* (2006.01)

(52) U.S. Cl.
CPC ....... *G01N 30/86* (2013.01); *G01N 2030/027* (2013.01); *G01N 2030/326* (2013.01); *G01N 2030/385* (2013.01)

(58) Field of Classification Search
CPC ..... G01N 2030/8804; G01N 2035/009; G01N 2035/1018; G01N 30/02; G01N 30/18; G01N 30/22; G01N 30/8658; G01N 30/88; G01N 35/00; G01N 35/00693; G01N 35/00732; G01N 35/025; G01N 35/10; G01N 35/1009; B01D 15/163; B01D 15/40; F04B 13/02; F04B 2201/0201; F04B 2205/05; F04B 2205/09; F04B 2205/503; F04B 23/04; F04B 39/06; F04B 49/06; F04B 53/06; G01F 1/6842; G01F 1/6847; G01F 1/6888; G01F 1/69; G01F 1/6965; G01F 25/10; G05D 11/132; Y10T 137/85986

See application file for complete search history.

(56) References Cited

U.S. PATENT DOCUMENTS

| | | | |
|---|---|---|---|
| 7,550,080 | B2 | 6/2009 | Morikawa |
| 9,664,653 | B2 | 5/2017 | Hochgraeber |
| 10,288,637 | B2 | 5/2019 | Tamezane et al. |
| 10,962,394 | B2 | 3/2021 | Ruegenberg et al. |
| 11,047,835 | B2 | 6/2021 | Kimoto et al. |
| 11,143,634 | B2 * | 10/2021 | Tarafder .................. F04B 39/06 |
| 2004/0034479 | A1 * | 2/2004 | Shimase ............ G01N 35/1016 702/31 |
| 2011/0259451 | A1 | 10/2011 | Weisgerber |
| 2014/0131277 | A1 | 5/2014 | Gerhardt et al. |
| 2015/0233873 | A1 | 8/2015 | Yanagisawa |
| 2016/0199751 | A1 | 7/2016 | Shreve |
| 2018/0345175 | A1 | 12/2018 | Schlake et al. |
| 2019/0277814 | A1 * | 9/2019 | Kimoto .................. G01N 30/64 |

FOREIGN PATENT DOCUMENTS

| | | |
|---|---|---|
| EP | 2235519 B1 | 3/2013 |
| WO | 2019211930 A1 | 11/2019 |

\* cited by examiner

STATE DETERMINATION OF A FLUIDIC SYSTEM

CROSS REFERENCE TO RELATED APPLICATION

This application is a continuation of U.S. patent application Ser. No. 16/921,425, filed on Jul. 6, 2020. U.S. Ser. No. 16/921,425 claims the priority benefit under 35 U.S.C. § 119 to German Patent Application No. 10 2019 118 205.0, filed on Jul. 5, 2019, the disclosure of which is incorporated herein by reference in its entirety.

FIELD OF INVENTION

The present invention generally relates to fluidic systems. Embodiments of the present invention relate to the field of chromatography, such as liquid chromatography (LC) and particularly to the field of High Performance Liquid Chromatography (HPLC) and Ultra-High Performance Liquid Chromatography (UHPLC).

BACKGROUND

In the below, the present invention will be described with a primary focus on chromatography systems. However, it should be understood that this is merely exemplary and that the present invention can also be employed in other fluidic systems.

LC is based on chromatographic separation. A sample is separated into a characteristic separation pattern by pumping the sample together with an elution solvent (both are also referred to as mobile phase) through a chromatographic column which contains a solid—i.e. the stationary phase. The analyte contained in the mobile phase interacts with this stationary phase. Depending on the intensity of the interaction between mobile phase and temporarily bound analyte, the analyte is retained to a characteristic degree. Thus, strong interaction of a particular analyte component with the stationary phase results in a delayed passage time compared to a component showing only weak interaction. This results in components exiting the separation column at different times depending on the interaction strength. This time is referred to as the retention time. It is a characteristic property of the respective component under the respective chromatographic conditions.

The separation of compounds can be influenced by adjusting the composition of the mobile phase over time. That is, typically two (or more) solvents of different type are combined using sophisticated fluid actuation. Thus, a given compound elutes once the solvent composition exceeds a threshold value (e.g. a certain volumetric concentration of solvent A in a blend of solvents A and B). This threshold value is characteristic for this given compound.

Subsequently, the eluting compound can be detected by an appropriate detector located downstream of the separation column. Upon passing of the compound through the detector a peak in the respective signal is obtained. Such a signal is referred to as a chromatogram. Depending on the complexity of the sample, it may consist of multiple peaks in short succession.

For reliable discrimination and subsequent identification of a compound in a sample of complex composition (i.e. consisting of many different compounds), a sufficient chromatographic separation is advantageous. Therefore, typically dedicated methods are employed to assure selectivity and sensitivity of the analysis.

Chromatography is a comparative analytical method. Thus, a given compound is identified by comparing the corresponding peaks of the detector signal against a corresponding reference. The latter is obtained by performing the analysis under the exact same (or at least comparable) conditions with a sample of known composition. An identification of a compound of the actual sample is achieved by matching the resulting signal peak to the corresponding peak of the reference. Therefore, reproducibility of the chromatographic process is advantageous for reliable identification in particular for complex samples. Thus, significant technological effort is being undertaken to enhance the performance of HPLC systems aiming at reproducibility.

A largely growing field for HPLC systems is the pharmaceutical sector. Besides being a tool for research and development, HPLC is widely employed in Quality Control (QC) in production. Therefore, it is increasingly important to assure and enhance the robustness of the HPLC instrumentation. Any unplanned downtime may cause adverse effects on throughput and productivity.

Moreover, it may also be beneficial to simplify usage of HPLC systems, such that such system can be used without requiring a high level of training. Also, for this reason, robust and reliable instrumentation is advantageous.

Generally, reproducibility is advantageous in HPLC. To assure robust analytical results, the performance of HPLC systems is regularly assessed using standardized operating procedures. For this purpose, a standard sample solution may be analyzed as a reference. This standard is a sample of predefined and known composition. It typically consists of compounds of known physicochemical properties. The amount and affinity (to a solid of the separation column) of a compound are of particular interest. Thus, under predefined chromatographic conditions a given compound of a standard solution is expected to show up in a resulting chromatogram as a peak that has a certain shape, peak area and retention time. The latter is typically a shallow time range into which a peak should fit. The width of the given window is equivalent to the reproducibility requirement for the given section of the chromatogram. Typically, multiple compounds are used as references to cover the relevant time range of the chromatogram with a representative number of test points.

Thus, if a peak of a standard sample does not fit into its corresponding analysis window it may be indicative of a malfunction (e.g. reduced chromatographic resolution) of the chromatographic analysis. Such malfunctions frequently have ambiguous causes related to either the HPLC system, the sample or the operating environment. This frequently results in elaborate troubleshooting through trained personal for identification of the root cause.

Typical causes for compromised performance of HPLC systems are the following: The hardware may show wear and tear as well as it may have defects. Further, aging of the column as well as, in some cases, software and/or firmware issues may compromise the performance. In addition, user errors, such as incorrect/inadequate method settings, incorrect calibrations, wrong solvents as well as environmental influences, including, but not limited to, temperature, humidity, vibrations and ambient pressure may be further origins of a compromised performance of HPLC systems.

To prevent issues resulting from the hardware, particularly from worn parts, such components are typically proactively replaced during preventative maintenance. The expected lifetime of components is frequently defined based on a generalized usage profile. This lifetime value is typically derived from statistical data of a limited number of endurance tests that frequently have been performed throughout the development of the system/component. However, the actual lifetime of a component may vary considerably depending on the usage of the instrumentation, the environmental conditions, as well as variations of the component itself. The latter may be due to changes of supply chains, variation in material and/or production. Thus, a method that may allow to detect signs of developing (premature) failure of a component is highly desirable.

Hence, in state-of-the-art HPLC systems the remaining lifetime of parts is typically evaluated either based on usage counters, e.g. the number of switching cycles of a valve rotor, or, alternatively, parts are simply replaced during preventative maintenance in fixed intervals. Thus, the state-of-the-art process may not be tailored to specific usage characteristics of a given user. This may result in either unnecessary efforts for premature replacement of a still functional part or compromised performance and/or unplanned downtime in case of (premature) part failure prior to the scheduled preventative maintenance cycle.

In summary, in current fluidic systems there is no comprehensive, holistic mechanism that allows "online" (i.e. during routine system operation) detection of developing issues in an early stage prior to causing an unplanned downtime.

Again, in the prior art, preventative maintenance is employed, that is proactive replacements of wear parts in fixed intervals as well as usage/wellness counters for particular hardware components. E.g., a counter for the HPLC module's firmware is used that counts the number of switches of a valve rotor seal, to avoid performance issues and unplanned down time.

However, these measures might have certain drawbacks and limitations, as discussed above. That is, in general, no or only very limited means exist for preventative actions to avoid unplanned downtime.

SUMMARY

In light of the above, it is an object of the present invention to overcome or at least alleviate the shortcomings and disadvantages of the prior art. In general, it may be an object of the present invention to provide a technology to increase the robustness of a fluidic system. In other words, it is an object of the present invention to provide a technology reducing the downtime of a fluidic system and which does not require more service than is necessary.

In one embodiment, the objects of the invention are met by a fluidic system, wherein the fluidic system is configured to measure back pressures in the fluidic system at different times and to determine a state of the fluidic system, wherein the determination is based on at least the measured back pressures.

It will be understood that the back pressures measured in the fluidic system at different times refer to a time series of back pressure measurements and that a single measurement may be referred to as a measured back pressure. That is, the back pressure may be measured at one location in the system repeatedly at different times in order to create a time series of back pressure measurements, wherein each point of the time series may correspond to a single back pressure measurement.

Generally, the backpressure is the resistance opposing the flow of a fluid in a fluid conduit resulting effectively in a pressure drop along the conduit. It is thus frequently referred to as "backpressure". It is analog to the electrical resistance of an electrical circuit. Thus, similarly to functioning tests of electronics by means of probing the conductivity of electrical circuitry, the state (e.g., the "health state") of the fluidics of a fluidic system (e.g., a HPLC system) can be assessed. Changes in backpressure (trends over time) are indicative of (developing) issues of the system.

The fluidic system fluidic system may be a chemistry system.

In some embodiments the fluidic system may be a chemical analysis system, whereas in other embodiments it may be a preparative chemistry system.

Further, the fluidic system may be a liquid chromatography system.

Even further, the fluidic system may be a high performance liquid chromatography system.

The fluidic system may comprise a pump for generating a liquid flow.

The fluidic system may be configured to assume different configurations, wherein the configurations differ at least as regards which components are fluidly connected to the pump. That is, not all components of the fluidic system may be fluidly connected to the pump in every configuration.

In this document, a fluid connection (or elements being fluidly connected to one another) denotes that liquid can flow from one element to the other. Further, it will be understood that the word fluidly may be replaced with the word fluidically. That is the meaning and scope of both words is considered identical within this document.

The fluidic system may comprise a switching valve for switching between the different configurations. That is, different components may be fluidly connected to the pump depending on the position of the valve.

The fluidic system may comprise a separation column.

The fluidic system may comprise a pre-column. A pre-column may refer to any column located upstream of the separation column of the fluidic system, i.e. any column located within the fluidic path such that a fluid passes the pre-column before the separation column.

The fluidic system may comprise tubing fluidly connecting the switching valve to the components. That is, the components of the system may be fluidly connected to the valve by means of tubing, such as capillaries.

The fluidic system may comprise a trap column. That is, a column for storing a sample prior to injection into an analytical flow through the separation column.

The fluidic system may comprise a sample loop, a needle and a needle seat.

The fluidic system may comprise a pressure sensor to measure the back pressures.

The fluidic system may comprise a data storage unit.

The fluidic system may comprise a thermostated column compartment. The thermostated column compartment may be utilized to control and stabilize the temperature of one or more columns, e.g. the analytical column.

The fluidic system may comprise a detector, configured to detect an amount of analyte. Such a detector may for example be a charged aerosol detector, a UV-Vis detector, a refractive Index detector, a fluorescence detector, an evaporative light scattering detector or a diode array detector.

The fluidic system may comprise a data analysis unit.

That is, in some embodiments, the data evaluation needed for evaluation of the backpressure may occur in the system itself, e.g. in the data analysis unit of the fluidic system. That is, the data analysis unit may comprise a diagnostics unit configured to analyze the backpressure data. Thus, no data may be transferred to outside of the system. This may particularly concern any data of sensitive content with respect to the sample and/or the method. This may be advantageous in light of requirements of users and/or regulatory authorities regarding data privacy.

In a further embodiment, the present invention relates to a method for determining a state of a fluidic system. The method comprises measuring back pressures in the fluidic system at different times and determining a state of the fluidic system, wherein the determination is based on at least the measured back pressures.

That is, the method is based on monitoring the system backpressure (e.g., of a HPLC system) and determining the system state based on the backpressure data. For example, instances of increasing backpressure may be indicative of blockages within the fluidics (including column) of the HPLC system. Likewise, instances of a decrease or drop in the system backpressure may indicate leakages in the fluidic system. The monitoring of the system backpressure may for example be continuous monitoring.

In other words, the state, e.g., the health state, of the fluidic system may be assessed, i.e. it may be checked whether or not there may be a (potentially developing) issue.

The determination may also be based on additional status information indicative of at least one status of the fluidic system at at least one of the different times.

That is, to further improve correct identification and prevent false errors, the monitoring of the backpressure may be supplemented by additional data, i.e., additional status information.

In other words, the back pressure may be monitored, e.g., continuously monitored. Based on this monitoring, a state (e.g., a "health state" of the fluidic system) may be determined. For example, if there is a substantial drop in the back pressure, this may be indicative of a leak or a degradation of the column. Conversely, if there is a substantial increase in the back pressure, this may be indicating a blockage. However, in embodiments, it may be preferred to not only use the measured back pressures for the state determinations, but also additional status information. For example, a flow setting of the fluidic system may be altered. Such a change of the flow setting may also impact the back pressure. That is, when accounting for such additional status information, one may more reliably determine whether a change in the back pressure is due to such changes, or due to a change in a "health state" of the system.

Hence, in order to get improved results, the backpressure reading(s) may be aligned with at least one, or a plurality, of other system and/or method parameters. Therefore, the presented method may describe a workflow for holistic (i.e. determines the state on the system level) and continuous monitoring of the system state by evaluating the system backpressure relative to at least one, or a plurality, of other system parameters during normal device operation. Thus, this method may also be referred to as "online" diagnostics. It may take the "bigger picture" of the system state into account to facilitate identification of developing issues and subsequent identification of particular root causes with sufficient probability.

The fluidic system may be as described above.

The back pressures may be measured at a sensing location being fluidly connected to the pump.

In this document, a direct fluid connection (or elements being directly fluidly connected to one another) denotes that liquid can flow between these elements without passing another element (except for a capillary or tube).

The sensing location may be directly fluidly connected to the pump. That is, there may be no functional element other than the tubing between the pressure sensor and the pump.

Each back pressure may be a pressure reached in a configuration after equilibration.

The step of determining a state of the fluidic system may comprise comparing the measured back pressures to at least one reference. This may be advantageous for robustly determining the state of the system. That is, including at least one reference may enable a more reliable determination of the system state.

The at least one reference may be based on prior measurements of the back pressure.

Further, the reference used in the comparison step may depend on the additional status information.

The step of determining a state of the fluidic system may further comprise determining a deviation when an absolute value between a measured back pressure and the at least one reference exceeds a threshold. Such a threshold may indicate a criticalness of a suspected issue.

The deviation may be determined for the fluidic system assuming a first configuration and the method may further comprise the fluidic system assuming a second configuration, which is different from the first configuration, and determining whether the deviation occurs in this second configuration and may thus narrow down possible causes for the deviation. This may be advantageous as it may enable to identify a subsystem or preferably component that may be the likely cause of the deviation and thus may provide the possibility to provide information for fixing a problem leading to the deviation.

When a measured back pressure exceeds the at least one reference by more than a threshold, a flow blockage in the fluidic system may be determined.

When a measured back pressure is below the at least one reference and a difference between the at least one reference and this measured back pressure is greater than a threshold, a flow leakage in the fluidic system may be determined.

When the flow blockage is determined for a configuration with a fluid connection between the pump and the separation column, the flow blockage may be determined to occur in the separation column.

When the flow blockage is determined for a configuration with a fluid connection between the pump and the pre-column column, the flow blockage may be determined to occur in the pre-column.

The additional status information may include idle times of the fluidic system, and when an idle time preceding the determined flow blockage exceeds a threshold, the flow blockage may be determined to occur in the tubing.

The additional status information may comprise information of components of the fluidic system. The information of components of the fluidic system may comprise at least one of a historic back pressure of at least one of the components, and preferably of a combination of the components and a historic leak rate of at least one of the components.

The information of components of the fluidic system may comprise at least one of an inner diameter of the separation column, a length of the separation column, a filing material of the separation column, an expected backpressure of the separation column, and an expected service life span of the separation column.

Further, the information of components of the fluidic system may comprise at least one of a type of the switching valve, positions of the switching valve, friction values of the switching valve, and positioning values of the switching valve.

Yet further, the information of components of the fluidic system may comprise at least one of
- a volume of the sample loop,
- a form, a volume and/or a material of a sample compartment, and
- a type and/or an expected service life span of the needle and/or the needle seat.

A sample compartment may typically contain a sample and may be placed in an autosampler for injection and analysis. Such a sample compartment may for example be a vial or a microtiter well plate. That is, different sample compartments may vary greatly in comparison to each other, for example in form, volume or material. The sample compartments can be the origin of particulate matter which can cause blockages in the system. In particular, depending on the type of sample compartment, the risk of dissolved particles, i.e. particulate matter, may vary. Therefore, additional information on the sample compartment may be advantageous. A sample compartment may also be referred to as a sample reservoir.

The information of components of the fluidic system may comprise information of the tubing.

The information of components of the fluidic system may comprise failure information of the components.

The additional status information may comprise parameters of a procedure performed by the fluidic system. The parameters of the procedure may comprise at least one of a pressure, a volume and a flow at the separation column.

Further, the parameters may comprise a volume displacement of the pump.

The parameters may comprise at least one of additional pressure values and a measured flow. Additional pressure values may for example be pressure values measured for sub-units of the pump, i.e. individual pump blocks.

The parameters may comprise at least one of
- time stamps of the procedure, such as starting times of a stage and/or stopping times of
- a stage,
- a flow setting,
- a temperature setting,
- sample features, such as sample composition, sample viscosity, and/or degree of particulates,
- an inject volume and
- loading parameters, such as loading volume, loading pressure, and/or loading flow.

The parameters may comprise at least one of a pressure, a volume and a flow at the trap column.

The parameters may comprise one or more solvents used in the procedure.

The additional status information may comprise the configurations assumed by the fluidic system at the different times. Such configurations may also be indicative, e.g., of how a trap column is used (e.g., for forward or backward flush), what kind of injection (e.g., direct injection, 2D injection, tandem injection) is used.

The additional status information may comprise environmental operating conditions occurring at at least one of the different times.

The environmental operating conditions may comprise at least one of an ambient temperature, an ambient pressure and an ambient humidity.

The method may further comprise outputting information depending on the determined state of the fluidic system.

The output information may comprise at least one of
- the determined state,
- at least one prompt prompting the user to input information relating to the determined state, and
- a recommendation to act in view of the determined state.

The output information may comprise at least one of
- the determined state,
- a request for scheduling a test to test the correctness of the determined state, and
- a request to set a reminder.

The determination may be performed by a data processing unit. The data processing unit may be part of the fluidic system. That is, the method is performed locally, without the need to send data via the internet. For example, the data processing unit may be part of the data analysis unit of the fluidic system.

The step of determining a state of the fluidic system may comprise utilizing at least one mathematical method and preferably at least one statistical method. For example, deviations of the backpressure may be determined by mathematical and statistical means, e.g. trend analysis.

The step of determining a state of the fluidic system may comprise utilizing a machine learning method and/or an artificial intelligence method.

The at least one reference that the measured back pressures may be compared to may be based on back pressures measured under conditions which are at least comparable to conditions at the different times.

The data storage unit may comprise the back pressures measured under the at least comparable conditions.

The method may further comprise storing the measured back pressures in the data storage unit.

The method may comprise storing the additional status information in the data storage unit.

The method may comprise operating at least a portion of the fluidic system at pressures exceeding 100 bar, preferably exceeding 500 bar, such as exceeding 1,000 bar.

The system may be configured to perform the method according to any of the preceding method embodiments.
  use of the fluidic system according to any of the preceding system embodiments in a method according to any of the preceding method embodiments.

That is, generally, the present invention provides a novel holistic approach to monitor, e.g. continuously monitor, the state of a system (e.g., an HPLC installation) during routine operation (online diagnostics). In particular, the health state of the fluidic system may be assessed, i.e., it is checked whether or not there is, or might be, a (developing) issue. In other words, the present invention provides a system monitor to determine the "health state" on the system level, thus increasing robustness and facilitating support by identifying developing issues already in an early phase, ideally before causing an unplanned downtime of the system. The concept is generic and can be applied to any fluidic system, particularly any HPLC system. It allows for detection of developing issues and thus to prevent/reduce unplanned downtime of fluidic systems, e.g., HPLC systems.

This might be advantageous, since it may reduce unplanned downtime through identification of problematic components of the system before a system downtime is caused, whilst avoiding unnecessary preventative replacements of parts.

To satisfy data privacy requirements, the system architecture for data analysis may be confined to the system.

Further, the present invention may provide means to, once a problem is suspected, confirm the issue and locate its root cause. For example, a (developing) leakage may be determined somewhere in the system during monitoring thereof. Subsequently, a procedure may run (automatically) to trace the issue to a particular subset of the fluidic system, such as a certain fluidic connection point. In particular, the herein described method also allows for localization of an issue to a subset of the system. Throughout the course of a typical sample run, different fluidic pathways are active (i.e. pressurized or subject to flow) at different times depending on the momentary stage in the chromatographic workflow. Thus, a multitude of different backpressure values can be obtained, each representing a given state of the system and its configuration. Thus, besides assessing the health state of the system, i.e., to check whether a system is OK, this additionally allows to monitor with rather fine granularity which subset of a fluidic system might be or become problematic.

Such localization/identification of problematic subsets of a system can be further improved by using additional statistical information such as part failure statistics. For instance, if the backpressure monitoring identified an issue in a given subsystem A, where there are 3 components contained in this subsystem and the probability for a failure of component 2 is significantly higher than the other components, component 2 is likely causing the issue and thus should be replaced first. Thus, part failure statistics can help identify most the probable component that has caused the issue.

Once a potential issue has been identified, a dedicated diagnostic test for verification and isolation of the root cause could be scheduled/triggered. Additionally, a warning message could be displayed to the user, which may also contain information that helps to resolve the given issue.

If the system identifies a change and/or trend in the backpressure data and thus a potential issue, it may react in different ways depending on the estimated seriousness of the issue.

Thus, a robust and easy-to-use method for online monitoring of the system health state is provided which may, compared to the state of the art, provide a higher throughput for the user and facilitate the service. That is, a technician may directly bring the required parts at the right time since the method enables a planned and scheduled service visit. This may in turn reduce the stress both on user and service end. And even further, the system may be isolated, that is data may be stored and analyzed solely within the system. Thus, there may be no dependency on internet connectivity for functionality of the backpressure monitoring and data privacy can be achieved.

In summary, the present invention may provide means to determine developing issues in line with subsequent verification of the kind and location of the given issue.

Put differently, the present invention may allow to increase the robustness of the system and facilitate support by identifying developing issues already in an early phase before they may cause an unplanned downtime of the system. This may be advantageous as the user may largely rely on robust instrumentation and fast and efficient technical support in case of an issue. Thus, the present technology may also be used by users having a level of training and experience sufficient for routine operation, but not sufficient for troubleshooting and service of the system.

Further, it will be understood that the present technology in particular may monitor the back pressure at the system level. This may be different to monitoring sensor readings on a sub-system level. On a sub-system level, for example, pressure fluctuations may indicate problems with check valves, leak sensors may indicate the presence of a solvent (or water) in a drainage from leakage somewhere in a corresponding subsystem, or compressibility of pumps during pressurization may indicate the presence of air and/or leakages. These means for diagnostics are limited to the sub-system level and/or component level, and may frequently not directly address the issues of the fluidics of the system, which typically are the predominant factor for the chromatographic performance of the system. That is, it may be an advantage of embodiments of the present invention that it operates on the complete system level.

Below, system embodiments will be discussed. These embodiments are abbreviated by the letter "S" followed by a number. When reference is herein made to a system embodiment, those embodiments are meant.

S1. A fluidic system, wherein the fluidic system is configured to
measure back pressures in the fluidic system at different times; and to determine a state of the fluidic system, wherein the determination is based on at least the measured back pressures.

S2. The fluidic system according to the preceding embodiment, wherein the fluidic system is a chemistry system.

S3. The fluidic system according to the preceding embodiment, wherein the fluidic system is a chemical analysis system.

S4. The fluidic system according to the penultimate embodiment, wherein the fluidic system is a preparative chemistry system.

S5. The fluidic system according to any of the preceding embodiments, wherein the fluidic system is a liquid chromatography system.

S6. The fluidic system according to the preceding embodiment, wherein the fluidic system is a high performance liquid chromatography system.

S7. The fluidic system according to any of the preceding embodiments, wherein the fluidic system comprises a pump for generating a liquid flow.

S8. The fluidic system according to the preceding embodiment, wherein the fluidic system is configured to assume different configurations, wherein the configurations differ at least as regards which components are fluidly connected to the pump.

S9. The fluidic system according to the preceding embodiment, wherein the fluidic system comprises a switching valve for switching between the different configurations.

S10. The fluidic system according to any of the preceding embodiments, wherein the fluidic system comprises a separation column.

S11. The fluidic system according to any of the preceding embodiments, wherein the fluidic system comprises a pre-column.

S12. The fluidic system according to any of the preceding embodiments with the features of embodiment S9, wherein the fluidic system comprises tubing fluidly connecting the switching valve to the components.

S13. The fluidic system according to any of the preceding embodiments, wherein the fluidic system comprises a trap column.

S14. The fluidic system according to any of the preceding embodiments, wherein the fluidic system comprises a sample loop, a needle and a needle seat.

S15. The fluidic system according to any of the preceding embodiments, wherein the fluidic system comprises a pressure sensor to measure the back pressures.

S16. The fluidic system according to any of the preceding embodiment, wherein the fluidic system comprises a data storage unit.

S17. The fluidic system according to any of the preceding embodiments, wherein the fluidic system comprises a thermostated column compartment.

S18. The fluidic system according to any of the preceding embodiments, wherein the fluidic system comprises a detector, configured to detect an amount of analyte.

S19. The fluidic system according to any of the preceding embodiments, wherein the fluidic system comprises a data analysis unit.

Below, method embodiments will be discussed. These embodiments are abbreviated by the letter "M" followed by a number. When reference is herein made to a method embodiment, those embodiments are meant.

M1. A method for determining a state of a fluidic system, the method comprising
measuring back pressures in the fluidic system at different times; and determining a state of the fluidic system, wherein the determination is based on at least the measured back pressures.

M2. The method according to the preceding embodiment, wherein the determination is also based on additional status information indicative of at least one status of the fluidic system at at least one of the different times.

M3. The method according to any of the preceding method embodiments, wherein the fluidic system is according to any of the preceding system embodiments.

M4. The method according to any of the preceding method embodiments, wherein the fluidic system comprises the features of embodiment S7, wherein
the back pressures are measured at a sensing location being fluidly connected to the pump.

M5. The method according to the preceding embodiment, wherein the sensing location is directly fluidly connected to the pump.

M6. The method according to any of the preceding method embodiments, wherein each back pressure is a pressure reached in a configuration after equilibration.

M7. The method according to any of the preceding method embodiments, wherein the step of determining a state of the fluidic system comprises comparing the measured back pressures to at least one reference.

M8. The method according to the preceding embodiment, wherein the at least one reference is based on prior measurements of the back pressure.

M9. The method according to any of the 2 preceding embodiments with the features of M2,
wherein the reference used in the comparison step depends on the additional status information.

M10. The method according to any of the 3 preceding embodiments, wherein the step of determining a state of the fluidic system further comprises
determining a deviation when an absolute value between a measured back pressure and the at least one reference exceeds a threshold.

M11. The method according to the preceding embodiment, wherein the fluidic system comprises the features of S8, wherein
the deviation is determined for the fluidic system assuming a first configuration, and wherein the method further comprises
the fluidic system assuming a second configuration, which is different from the first configuration, and determining whether the deviation occurs in this second configuration, and
thus narrowing down possible causes for the deviation.

M12. The method according to any of the 5 preceding embodiments, wherein
when a measured back pressure exceeds the at least one reference by more than a threshold, a flow blockage in the fluidic system is determined.

M13. The method according to any of the 6 preceding embodiments, wherein
when a measured back pressure is below the at least one reference and a difference between the at least one reference and this measured back pressure is greater than a threshold, a flow leakage in the fluidic system is determined.

M14. The method according to any of the preceding method embodiments with the features of embodiment M12, wherein the fluidic system comprises the features of embodiment S10,
wherein, when the flow blockage is determined for a configuration with a fluid connection between the pump and the separation column, the flow blockage is determined to occur in the separation column.

M15. The method according to any of the preceding method embodiments with the features of embodiment M12, wherein the fluidic system comprises the features of embodiment S11,
wherein, when the flow blockage is determined for a configuration with a fluid connection between the pump and the pre-column column, the flow blockage is determined to occur in the pre-column.

M16. The method according to any of the preceding method embodiments with the features of embodiments M2 and M12, wherein the fluidic system comprises the features of embodiment S12,
wherein the additional status information includes idle times of the fluidic system,
and wherein, when an idle time preceding the determined flow blockage exceeds a threshold, the flow blockage is determined to occur in the tubing.

M17. The method according to any of the preceding method embodiments with the features of embodiment M2,
wherein the additional status information comprises information of components of the fluidic system.

M18. The method according to the preceding embodiment, wherein the information of components of the fluidic system comprises at least one of
a historic back pressure of at least one of the components, and preferably of a combination of the components;
a historic leak rate of at least one of the components.

M19. The method according to any of the 2 preceding embodiments, wherein the fluidic system comprises the features of embodiment S10,
wherein the information of components of the fluidic system comprises at least one of an inner diameter of the separation column;
a length of the separation column;
a filing material of the separation column;
an expected backpressure of the separation column; and
an expected service life span of the separation column.

M20. The method according to any of the 3 preceding embodiments, wherein the fluidic system comprises the features of embodiment S9,
wherein the information of components of the fluidic system comprises at least one of a type of the switching valve;
positions of the switching valve;
friction values of the switching valve; and
positioning values of the switching valve.

M21. The method according to any of the 4 preceding embodiments, wherein the fluidic system comprises the features of embodiment S14,
wherein the information of components of the fluidic system comprises at least one of
a volume of the sample loop;
a form, a volume and/or a material of a sample compartment; and
a type and/or an expected service life span of the needle and/or the needle seat.

M22. The method according to any of the 5 preceding embodiments, wherein the fluidic system comprises the features of embodiment S12,
 wherein the information of components of the fluidic system comprises information of the tubing.

M23. The method according to any of the 6 preceding embodiments, wherein the information of components of the fluidic system comprises failure information of the components.

M24. The method according to any of the preceding method embodiments with the features of embodiment M2,
 wherein the additional status information comprises parameters of a procedure performed by the fluidic system.

M25. The method according to the preceding embodiment, wherein the fluidic system comprises the features of embodiment S10,
 wherein the parameters of the procedure comprise at least one of a pressure, a volume and a flow at the separation column.

M26. The method according to any of the 2 preceding embodiments, wherein the fluidic system comprises the features of embodiment S7, wherein the parameters comprise
 a volume displacement of the pump.

M27. The method according to any of the 3 preceding embodiments, wherein the parameters comprise at least one of
 additional pressure values and
 a measured flow.

M28. The method according to any of the 4 preceding embodiments, wherein the parameters comprise at least one of
 time stamps of the procedure, such as starting times of a stage and/or stopping times of a stage;
 a flow setting;
 a temperature setting;
 sample features, such as sample composition, sample viscosity, and/or degree of particulates;
 an inject volume; and
 loading parameters, such as loading volume, loading pressure, and/or loading flow.

M29. The method according to any of the 5 preceding embodiments, wherein the fluidic system comprises the features of S13, wherein the parameters comprise at least one of
 a pressure, a volume and a flow at the trap column.

M30. The method according to any of the 6 preceding embodiments, wherein the parameters comprise one or more solvents used in the procedure.

M31. The method according to any of the preceding method embodiments with the features of embodiment M2, wherein the fluidic system comprises the features of embodiment S8,
 wherein the additional status information comprises the configurations assumed by the fluidic system at the different times.

Such configurations may also be indicative, e.g., of how a trap column is used (e.g., for forward or backward flush), what kind of injection (e.g., direct injection, 2D injection, tandem injection) is used.

M32. The method according to any of the preceding method embodiments with the features of embodiment M2,
 wherein the additional status information comprises environmental operating conditions occurring at at least one of the different times.

M33. The method according to the preceding embodiment, wherein
 the environmental operating conditions comprise at least one of an ambient temperature, an ambient pressure and an ambient humidity.

M34. The method according to any of the preceding method embodiments, wherein the method further comprises
 outputting information depending on the determined state of the fluidic system.

M35. The method according to the preceding embodiment, wherein
 the output information comprises at least one of
 the determined state;
 at least one prompt prompting the user to input information relating to the determined state; and
 a recommendation to act in view of the determined state.

M36. The method according to the penultimate embodiment, wherein
 the output information comprises at least one of the determined state;
 a request for scheduling a test to test the correctness of the determined state; and
 a request to set a reminder.

M37. The method according to any of the preceding method embodiments, wherein the determination is performed by a data processing unit.

M38. The method according to the preceding embodiment, wherein the data processing unit is part of the fluidic system.

That is, the method is performed locally, without the need to send data via the internet.

M39. The method according to any of the preceding method embodiments, wherein the step of determining a state of the fluidic system comprises utilizing at least one mathematical method and preferably at least one statistical method.

M40. The method according to any of the preceding method embodiments, wherein the step of determining a state of the fluidic system comprises utilizing a machine learning method and/or an artificial intelligence method.

M41. The method according to any of the preceding method embodiments with the features of embodiment M7,
 wherein the at least one reference is based on back pressures measured under conditions which are at least comparable to conditions at the different times.

M42. The method according to the preceding embodiment, wherein the system comprises the features of embodiment S16, wherein the data storage unit comprises the back pressures measured under the at least comparable conditions.

M43. The method according to any of the preceding method embodiments, wherein the system comprises the features of embodiment S16, wherein the method further comprises storing the measured back pressures in the data storage unit.

M44. The method according to any of the preceding method embodiments with the features of embodiment M2, wherein the system comprises the features of embodiment S16, wherein the method comprises storing the additional status information in the data storage unit.

M45. The method according to any of the preceding method embodiments, wherein the method comprises operating at least a portion of the fluidic system at pressures exceeding 100 bar, preferably exceeding 500 bar, such as exceeding 1,000 bar.

S20. The fluidic system according to any of the preceding system embodiments, wherein the system is configured to perform the method according to any of the preceding method embodiments.

Below, use embodiments will be discussed. These embodiments are abbreviated by the letter "U" followed by a number. When reference is herein made to a use embodiment, those embodiments are meant.

U1. Use of the fluidic system according to any of the preceding system embodiments in a method according to any of the preceding method embodiments.

Embodiments of the present invention will now be described with reference to the accompanying drawings. These embodiments should only exemplify, but not limit, the present invention.

It is noted that not all the drawings carry all the reference signs. Instead, in some of the drawings, some of the reference signs have been omitted for the sake of brevity and simplicity of the illustration. Embodiments of the present invention will now be described with reference to the accompanying drawings.

DETAILED DESCRIPTION OF EMBODIMENTS

Figure 1:
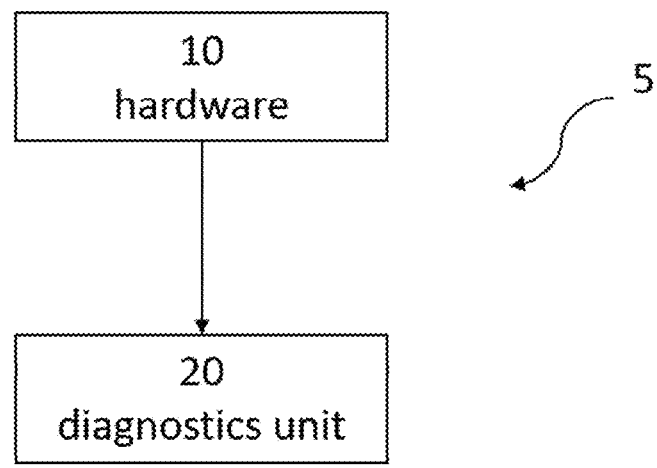
FIG. 1 depicts a system according to an embodiment of the present invention.

FIG. 1 depicts a fluidic system 5 according to an embodiment of the present invention, comprising hardware 10, wherein the hardware comprises at least one backpressure sensor. The fluidic system 5 may be such as a chromatography system, an LC, HPLC or UHPLC system. In other words, the fluidic system 5 may comprise at least one pressure sensor configured to measure the backpressure of the fluidic system 5. Further, the system 5 comprises a diagnostics unit 20, wherein the diagnostics unit is configured to receive data from the hardware 10. In particular, the diagnostics unit may receive data measured by the backpressure sensor.

The diagnostics unit 20 may be incorporated into the hardware 10. That is, it may at least be partially integrated into the hardware 10 of the fluidic system 5 by means of software and/or firmware. In other words, in some embodiments, the diagnostics unit 20 may not require any additional hardware, but use the hardware 10 already provided by the fluidic system 5.

The diagnostics unit 20 may continuously monitor the backpressure of the fluidic system 5. Further, the diagnostics unit 20 may apply mathematical and in particular statistical methods to identify deviations of the measured backpressure value from the expected value. In particular, the diagnostics unit 20 may identify deviations with respect to time and/or number of sample injection/measurement.

Figure 2:
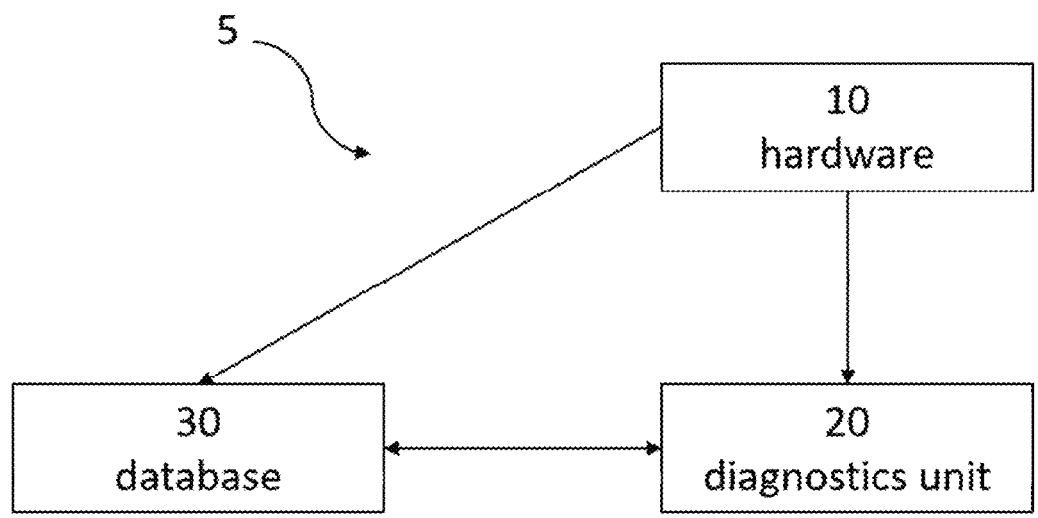
FIG. 2 depicts a system according to a further embodiment of the present invention.

With reference to FIG. 2, a fluidic system 5 according to an embodiment of the present invention may further comprise a database 30. The database 30 may store parameters and data relevant for the operation and/or measurements performed on the hardware 10 of the fluidic system 5. The database 30 may further be connected to the diagnostics unit 20, providing access to the historical data and receiving new data from the diagnostics unit 20. In other words, the database 30 may provide means to store and build up a local collection of historic data as well as the means to align the backpressure readings with other system and/or method parameters.

During operation, this may be advantageous as it may enable the prevention of false errors. That is, errors based on a change of backpressure which may for example have a cause related to a changed method or other system parameters.

As discussed, the herein described method may not only allow to identify a potential issue but to further identify a subset of the fluidic system that may be the cause for the issue, based on the information that different fluidic pathways are active (i.e. pressurized or subject to flow) at different times depending on the momentary stage in the chromatographic workflow. This will briefly be illustrated with reference to FIG. 3, providing an example of an HPLC system with a pulled loop autosampler (which is an example of a switching valve) in a direct injection configuration. However, it may be noted that with respective modifications the principle is applicable to essentially all HPLC systems.

Figure 3:
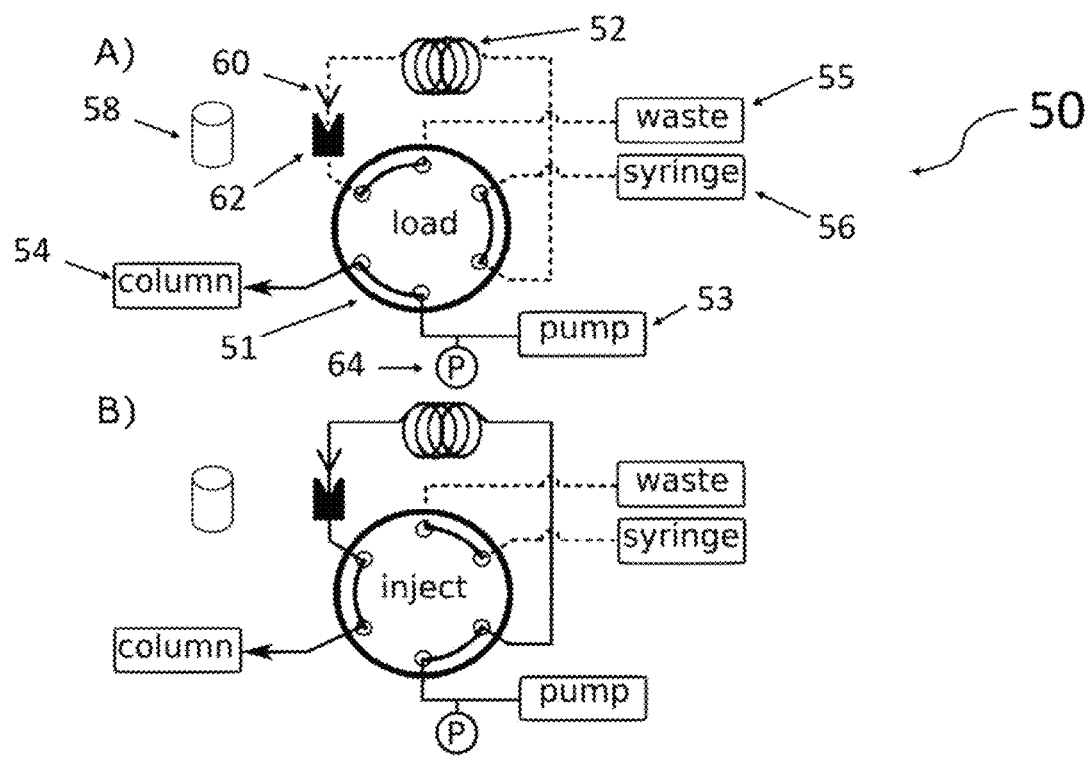
FIG. 3 depicts a pulled loop autosampler in its two possible states.

Generally, the fluidic system 50 comprises a two-position, six-port valve 51, also referred to as inject valve 51 or simply valve 51. Further, the system 50 comprises a sample loop 52 that connects two ports of the valve 51. In the section comprising the sample loop 52, there may also be provided a needle 60 and a needle seat 62. The remaining ports may be directly connected to a pump 53 supplying the eluent, a column 54, a waste reservoir 55 and a syringe 56. In the configuration depicted in FIG. 3A), the pump 53 and the column 54 are fluidly connected. Further, in this configuration, also the syringe 56, the sample loop 52, the needle 60 and needle seat 61 and the waste 55 may be fluidly connected. In FIG. 3, the pump 53 and the column 54 may be connected to neighboring ports of the valve 51 and the syringe 56 and the waste 55 may be connected to neighboring ports of the valve 51, respectively.

In one position (FIG. 3A), the eluent from the pump 53 may directly flow towards the column 54. At the same time, the waste 55 and the syringe 56 may be connected through the sample loop 52 (and via the needle 60 and the needle seat 61). Thus, the sample may be pulled into the sample loop 52 by means of pulling the syringe 56. More particularly, in this configuration, the needle 60 may be separated from the needle seat 62, and may travel to a sample reservoir 58. Once it is located in the sample reservoir 58, the syringe 56 may be used to pull the sample into the sample loop 52. After this has been accomplished, the needle 60 may again be moved back to the needle seat 62.

The position or configuration depicted in FIG. 3A may be called "bypass" or loading position. The inject valve 51 is typically switched to a bypass position during sample pickup and metering. In this position the sample loop is not included in the pressurized flow path and thus not subject to flow by the chromatography pump.

In a second position (FIG. 3B), the eluent from the pump 53 may be directed to flow through the sample loop 52 before flowing to the column 54. In this position the waste 55 and the syringe 56 may be fluidly connected. Thus, the sample contained in the sample loop 52 may be injected into the column 54. This position may be called injecting position. During the injection phase when the sample is moved from the loop to the analytical column, the inject valve is in the "inject" position (FIG. 3B). In this stage the loop is included in the high-pressure flow path. More particularly, in this configuration, a flow generated by the pump 53 may flow through the sample loop 52, through the needle 60 located in the needle seat and then towards the column 54. It will be understood that thus, sample that was previously sucked into the sample loop 52 may be provided from the sample loop 52 to the column 54.

Thus, the embodiments depicted in FIG. 3 allows two different configurations of the fluidic system, corresponding to two fluidic pathways that are present in this example. This allows for discriminating potential issues of the injection flow path; the latter configuration (see FIG. 3(B)) including the inject valve 51, all related fluidic connections, the sample loop 52, and the column 54, as well as the needle 60 and the needle seat 62.

Furthermore, as also depicted in FIGS. 3(A) and (B), the fluidic system 50 also comprises a pressure sensor 64. The pressure sensor 64 is configured to measure back pressures in the fluidic system 50. The pressure sensor 64 may be fluidly connected to the pump 53. That is, fluid may flow between the pump 53 and the location where the pressure sensor 64 senses the pressure. In particular (and as depicted), the pressure sensor 64 may be directly fluidly connected to the pump 53, that is, there may be no other functional element (other than the tubing) between the pressure sensor 64 and the pump 53.

Thus, the pressure sensor 64 may measure back pressures. The back pressures are the pressures occurring in a configuration after equilibration.

If a significant change in the backpressure exceeding the contribution of the flow resistance of the injection flow path (i.e., the section of the system fluidly connected to the pump 53 in a configuration) is detected, it may indicate an issue related to the inject flow path. A typical cause for an increase in the backpressure of the injection flow path (see FIG. 3(B)) could be an accumulation of particles in the needle seat 62. A typical cause for an abnormally reduced backpressure between the two positions of the inject valve 51 would be a leakage due to a worn rotor seal in the valve 51.

In the following, possible signatures in a backpressure measurement are discussed with reference to typical sources for these signatures and the importance of additional parameters is illustrated presenting measured data.

Figure 4:
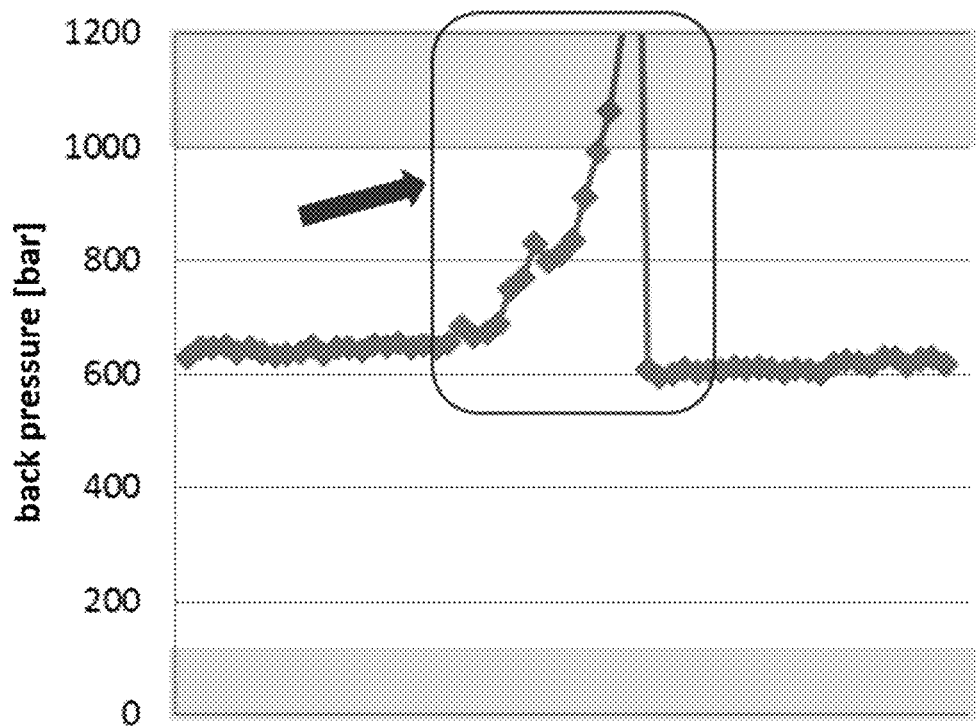
FIG. 4 depicts an exemplary measurement of increasing backpressure.

FIG. 4 shows exemplary backpressure measurements of an HPLC system (more particularly, an EASY-nLC 1200 HPLC system was used). Each data point represents the backpressure value of a single injection determined after column equilibration. That is, again with reference to FIG. 3 above, the system 50 is switched to the inject state depicted in FIG. 3(B), and one waits until the pressure reaches a constant value, which is the equilibrium state in the given configuration.

The data show intermittent increases of the system backpressure over time for comparable conditions. This behaviour may be indicative of a (developing) blockage in the system and in this particular case due to a developing column blockage, which is the most likely type of blockage in an HPLC system. The shaded areas of the graph illustrate the parameter space which may be indicative of a severe systemic or applicative issue (i.e., pressures above 1,000 bar and below approximately 125 bar). This may provide means to define threshold values for the backpressure value with respect to the "system health".

Figure 5:
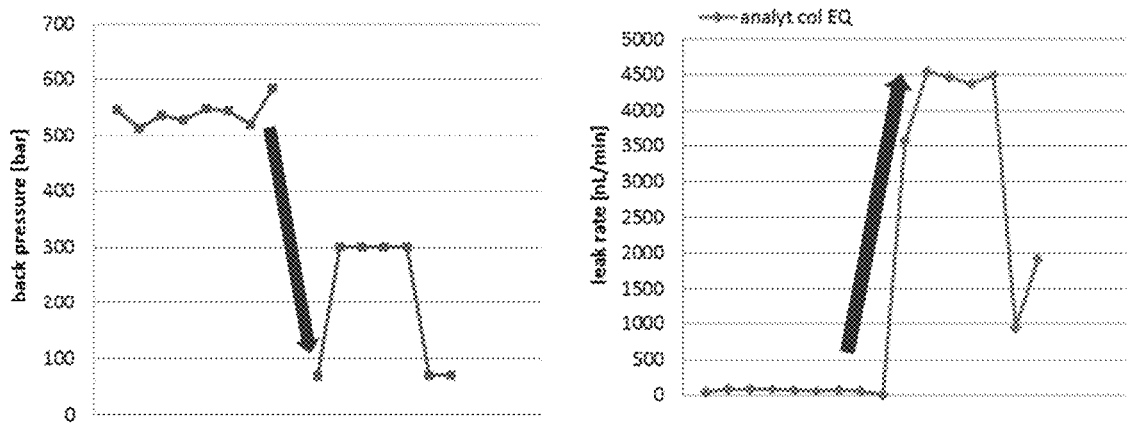
FIG. 5 depicts an exemplary measurement of decreasing backpressure.

The opposite behaviour, that is a decrease of backpressure over time for comparable conditions, is shown in FIG. 5. Again, each data point in the left panel represents the backpressure for a single injection. A sudden drop in backpressure is indicative of a (developing) leak. In this particular case, a leakage of the pump and more particularly at a location between the pump and upstream of a flow sensor. The right panel shows the respective leak rates as determined by the pump (volume displacement vs. flow sensor readings).

That is, in other words, the left panel of FIG. 5 depicts measured back pressures for consecutive injections. For the first injections, the measured back pressure is between 500 bar and 600 bar. For the next injection, the back pressure is below 100 bar and subsequently either at around 300 bar or below 100 bar.

The right panel in FIG. 5 depicts leak rates that were determined. More particularly, a volume displacement of a pump was determined and a flow was measured by a flow sensor. In an ideal case of no leakages, the difference between the measured flow and a flow based on the volume displacement by the pump should be zero. Generally, a difference between these two flows (measured actual flow and hypothetical flow due to the volume displacement of the pump) is indicative of a leakage. Such a leakage is depicted in the right panel of FIG. 5. As can be seen, initially, the leak rate is very low and then increases substantially. The increase coincides with the decrease in the back pressure (see left panel of FIG. 5). Thus, a sudden decrease in back pressure may be indicative of a leakage in the system. Generally, it will be understood that by monitoring the back pressure, one may determine a state of the system (e.g., a blocked state or a state of leakage).

Generally, it will be understood that the back pressure can, e.g., rapidly and unexpectedly increase or decrease.

Typical and/or likely sources for an increased backpressure may be blocked columns, incorrect tubing or a blockage elsewhere.

The columns act like inline-filters for particles within the system. Thus, they are the most likely sources for an increased backpressure. For the analytical column (and a guard column) particularly the backpressure after column equilibration, that is flushing of the column with the eluent (valve 51 in bypass position—see FIG. 3(A)), may be considered. This might be beneficial due to the reduced fluidic path length, that is some other potential causes for the backpressure increase may be excluded. In contrast, for a precolumn the backpressure after precolumn equilibration as well as injection may be considered.

A further cause for a change in the back pressure may be caused by tubing (e.g., if wrong tubing is used in the fluidic system). Incorrect tubing, such as different, non-ideal tubing for the method and/or having a non-ideal inner diameter (ID), may typically occur when the user is switching to a different fluidic/methodic setup. This case may additionally be identified by a different method set and/or a system idle time prior to the run where the issue occurred (i.e., time needed to implement the changes to the hardware). Further, incorrect tubing between the pump and the injection valve may be diagnosed by measuring the backpressure during a system purge. Upon identification of potential incorrect tubing, a user interaction may be prompted, for example checking if the connection has been changed recently.

Additionally, blockages may occur on fluidic connections (ports). However, these blockages are rare and may only be located by running dedicated tests that might require manual user interaction.

A reduction in backpressure is typically related to leakages in the fluidic system. In low flow systems with flow-feedback, chromatographically relevant leakages are typically related to leaking connections (downstream of the flow sensors). Fluidic connections with proper fittings (e.g., Viper/nanoViper fittings) are known for a very consistent leak tightness. Thus, once a connection is established the leak-tightness does generally not change.

Therefore, leaking connections typically occur when connections have been newly established or changed. Thus, one may identify connections that are likely to be modified by the user to setup the system for different applications, such as changing the flow regime, e.g. from a low flow fluidic configuration where low ID (<50 µm) capillaries are used, to a high flow configuration with connections with higher ID (50-200 µm), or the inject mode, e.g. direct vs trap injection. Thus, changes to the respective method parameters may be evaluated to identify connections that may have been modified.

Generally, fluidic connections that are likely to be modified by the user comprise the connection between pump 53 and injection valve 51 (or between pump and sampler), connection(s) between injection valve 51 and column(s) 54 (or between sampler and column(s)) and connections of precolumn(s).

An additional factor that could account for a reduced backpressure is degradation of a column, which may be identified by tracking the usage of a given column (e.g., age of the column and/or number of injections of a column).

However, monitoring the backpressure value per se may not be sufficient for robust identification of a (developing) fluidic issue of the fluidic system. That is, it may be advantageous to not only measure and monitor the back pressure, but to also take into consideration additional status information when determining the state of the fluidic system.

Figure 6:
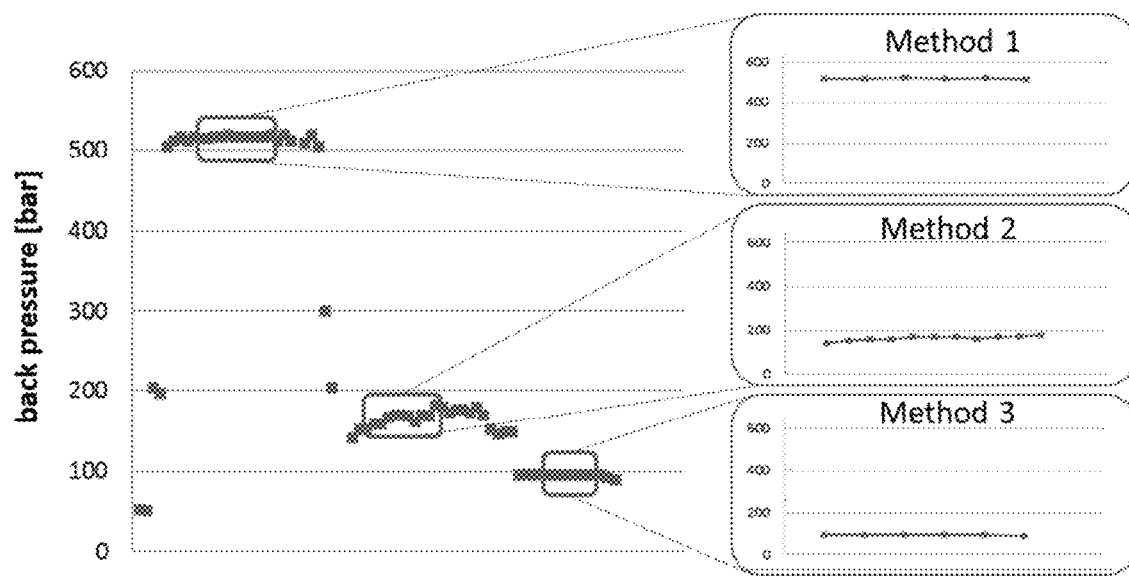
FIG. 6 depicts exemplary measurements of changing backpressure due to different method settings.

This is highlighted by the example presented in FIG. 6. Again, backpressure values of an HPLC system (EASY-nLC 1200) are plotted over time, i.e., for different injections. Each data point represents the backpressure value which was determined after the equilibration of the analytical column for a single sample injection It can be observed that initially the backpressure is stable at a value of about 500 bar. After several dozens of injections, the backpressure drops to about 170 bar, followed by another drop to pressure values of below 100 bar. These drops could be interpreted as developing leakages. However, the figure contains data from 71 injections where 26 different fluidic conditions and/or methods were used. Thus, if those values are aligned with the respective method sets used during those sample runs it is apparent that the drops in backpressure were caused by a change in the method settings rather than leakages. This is highlighted by the zoomed-in subsets presented on the right-hand side of FIG. 6, showing only data corresponding to identical fluidic and methodic conditions. Thus, the changes in backpressure are not due to a leakage.

That is, in other words, the zoomed in sections of FIG. 6 relate to injections having the same system and method settings (the uppermost referring to a method 1, the center one referring to a method 2 and the lowermost referring to a method 3). However, the method settings differ between method 1, 2, and 3. As one example, the flow of liquid through the system could be different. It will be understood that when the higher the flow of liquid through the fluidic system, the higher the pressure required to cause such a flow. Thus, e.g., when changing the flow of a pump, the pressure will also be changed. Thus, it may be beneficial to also take such parameters, relating to the system and process parameters into account when determining a state of the fluidic system by means of the measured back pressure.

The backpressure of an HPLC system generally depends on the following parameters: system configuration, method settings (application), state in the chromatographic workflow and operating conditions. Thus, it is advantageous to take these settings into account and to compare the backpressure values for injections to runs with identical, or at least comparable, fluidic conditions in order to get meaningful results from the monitoring thereof. This is advantageous for robust identification of developing issues.

Hence, a multitude of additional parameters (diagnostic KPIs—key performance indicators) may be recorded and evaluated to allow for robust assessment of the health state of the fluidics of an HPLC system. That is, the backpressure data points may each be additionally complemented by a set of KPIs identifying the system state and method parameters corresponding to that backpressure data point. The backpressure values may be classified by those parameters, e.g. by means of filtering. In other words, backpressure data measured under identical, or at least comparable conditions, that is, identical, or at least comparable values of the KPIs, may be isolated from available datasets. In subsequent steps the thus pooled backpressure datasets may be analyzed for significant changes or trends; i.e. increases or decreases. Finally, the result of the analysis may be compared against one or multiple threshold values. Each of these values is indicative of a certain criticalness of a suspected issue. Depending on evaluation different means for handling of the given issue are triggered.

All afore mentioned data analysis steps may occur continuously. Hence, the data of each sample run may be compared to the respective pool of historic data. Thus, with increasing number of comparable injections an increasingly robust information about the health state of the system may be obtained. To alleviate such data analysis the data may be stored and evaluated by means of a database 30 (see FIG. 8).

In the following, additional data that may be available to serve as KPIs is discussed.

Additional data that may be measured using corresponding sensors may be the column pressure as well as further pressure values (e.g. additional pressure readings of the different pump blocks, i.e. sub-units of a pump). In case of low-flow pumps the flow may also be directly measured. Further, the volume displacement of the pump may be measured, in some cases the piston positions and in specific cases the actual piston movement may be available.

For the injector/autosampler the pressure during precompression and injection of the sample may be estimated or measured.

As discussed, the database may also hold a collection of historic values, such as the backpressure values of a pump purging procedures, the leak rate of the inject valve, both, in the injection and the bypass position, the backpressure of a trap column, the backpressure of the analytical column and results of offline diagnostic scripts, e.g. leak and backpressure tests.

Further, the method settings and the device/system configuration may be used to identify identical, or at least comparable, measurement runs.

Information about the method settings, that is values that the user has set, may be available from the chromatography data system (CDS) or directly from the HPLC modules. These setting may include:
- information, e.g. start and/or stop timestamps, about the stages in the chromatographic workflow (e.g. equilibration, loading, gradient);
- set flow in a given stage;
- column configuration (e.g. Trap (forward, backward-flush), Direct injection, 2D, Tandem);
- set column temperature;
- sample position: samples can vary in composition (column backpressure), viscosity and may contain particulates to a different degree;
- inject volume;
- injection: volume/pressure/flow;
- equilibration of the analytical column: volume/pressure/flow; and/or
- equilibration of the trap column: volume/pressure/flow;

The hardware configuration and changes thereof may comprise the parameters related to the column(s), the autosampler or the tubing.

Related to a column the relevant parameters may comprise ID, length and the particles as well as the expected backpressure based on factory data and the lifetime in terms of number of injections.

Related to an autosampler the relevant parameters may comprise solvents (strong wash, weak wash), sample loop volume, valves (type, shifts, friction, positioning values), sample compartments, such as vials or microtiter well plates and needle/needle seat (type, number of injections).

The tubing may be of importance. Depending on the applications, a user may need to change the tubing and potentially run dedicated leak and backpressure test. In particular, the connection between a pump and an autosampler may frequently use different capillaries for different flow ranges and applications.

If the system identifies a change and/or trend in the backpressure data and thus a potential issue, it may react in different ways depending on the estimated seriousness of the issue.

In the case of a potentially serious issue, which may have direct and immediate effects in the analytical result, the user may be instantly notified through the user interface. This implies that the confidence that an issue exists is high. The user may receive a short descriptive text on the found issue and a short questionnaire to further back up the finding and/or help further isolation of the suspected issue may be displayed, if applicable. Further, the issue may be graphically highlighted and means to resolve the issue may be provided.

In the case of a suspected issue that may not (yet) have an immediate effect on the analytical result, a notification through the user interface may only be triggered once the measurement sequence is completed. An example would be the wear of a component which might fail in a foreseeable time frame. This implies that the confidence that an issue exists is not sufficiently high and thus additional test may be proposed for verification. The user may receive a short descriptive text of the suspected issue and there may be an option for automatic scheduling of a test that may further check the system when the system is idle. That is, a test focused on the suspected issue may be proposed, e.g. if a worn pump seal is suspected a dedicated test of this pump block should be performed. Further, an option to set a reminder may be provided. Thus, the issue may not be immediately fixed but a reminder to fix the issue when it fits best in the user's workflow may be set.

Figure 7:
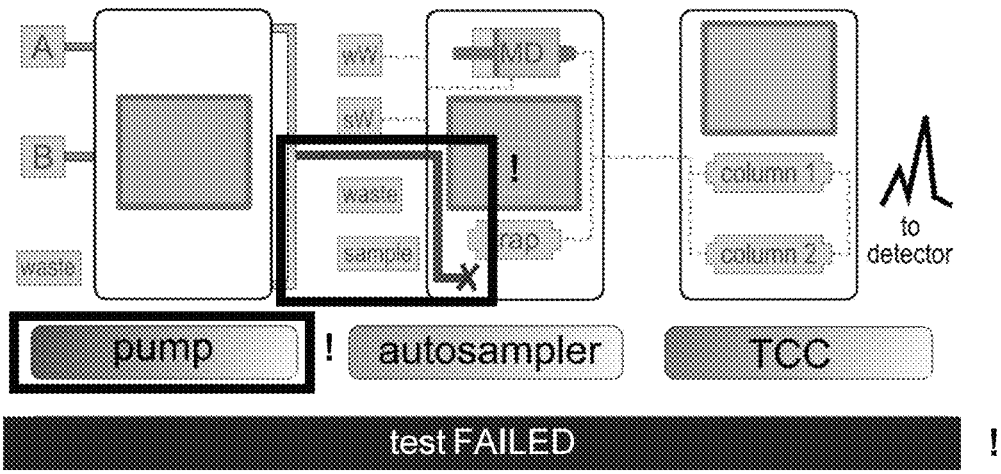
FIG. 7 depicts an exemplary user interface.

With reference to FIG. 7 an example of user guidance is presented. Generally, if an issue has been confirmed by the respective test, means to resolve this particular issue should be presented. These means may comprise any or all of the following: a short descriptive text on the found issue, graphical highlighting of the identified issue in a schematic system representation (see FIG. 7), a button to perform further tests (where applicable), a link to the manual section containing the relevant information, step-by-step instruction for fixing the particular issue in graphical, textual or video format, e.g. instruction on how to change a piston seal.

Figure 8:
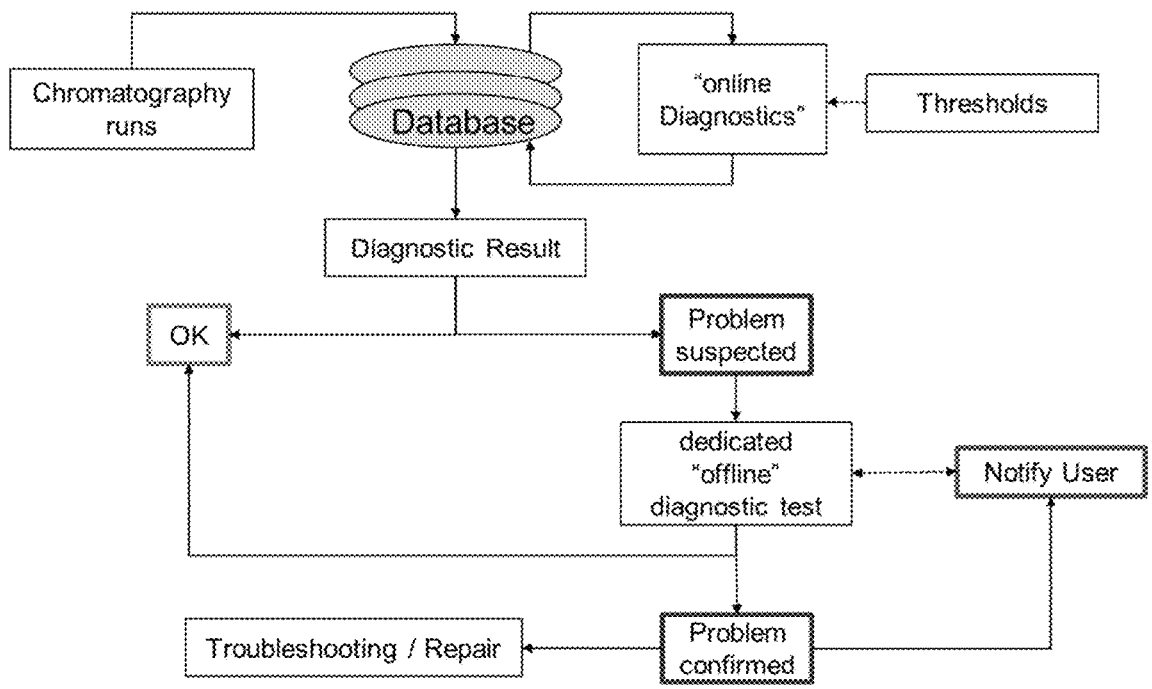
FIG. 8 depicts a workflow according to an embodiment of the present invention.

A workflow based on an embodiment of the present invention is presented in FIG. 8. For every chromatography run the corresponding diagnostic KPIs are stored in the database together with the corresponding measured backpressure values. The diagnostics unit ("online diagnostics") continuously monitors the backpressure of the current chromatography run and compares the values to historic data with identical, or at least comparable, KPIs. In order to identify if a change and/or trend in the backpressure data is indicative of a developing issue it is compared to at least one threshold. The threshold may correspond to a certain criticalness of a suspected issue. Based on this continuous monitoring of the system health a diagnostics result is generated. If the diagnostics unit identifies a suspected issue, it may trigger a response depending on the nature and the criticalness of the identified potential issue. If required a dedicated "offline" diagnostics test may be scheduled either immediately or after finishing the current measurements, depending on the criticalness of the potential issue and the effect it may have on the measurement results. Further, the user may be notified about the potential issue and/or the dedicated diagnostic test. The test may either resolve the problem or confirm it. If a problem is confirmed, the user is notified and further troubleshooting and/or a repair may be triggered.

That is, generally, the present invention may provide a technology to determine a state of a fluidic system 50 (see FIG. 3). To do so, a pressure sensor 64 may pressure back pressures of the system 50 at different times and preferably continuously. Furthermore, in embodiments of the present invention, also additional status information may be used. The measured back pressures and the additional status information may be used to determine the state of the fluidic system 50.

For example, if the additional status information indicates that no (substantial) change as regards the process and the system components occurred, but a deviation of the back pressure above a threshold occurred, the present technology may identify an issue. As one example, if an increase of the back pressure is determined in such a situation, the present technology may determine that a blockage occurred. Conversely, if a decrease of the back pressure is determined in such a situation, the present technology may determine that a leakage occurred.

Thus, the present invention provides a simple and reliable technology for monitoring the state of a fluidic system.

Whenever a relative term, such as "about", "substantially" or "approximately" is used in this specification, such a term should also be construed to also include the exact term. That is, e.g., "substantially straight" should be construed to also include "(exactly) straight".

Whenever singular articles are used in the description or appended claims, the singular form does not exclude a plurality, that is for example "a pump" may also comprise more than one pump. In other words, it may be read as "at least one pump", unless stated otherwise.

Whenever steps were recited in the above or also in the appended claims, it should be noted that the order in which the steps are recited in this text may be accidental. That is, unless otherwise specified or unless clear to the skilled person, the order in which steps are recited may be accidental. That is, when the present document states, e.g., that a method comprises steps (A) and (B), this does not necessarily mean that step (A) precedes step (B), but it is also possible that step (A) is performed (at least partly) simultaneously with step (B) or that step (B) precedes step (A). Furthermore, when a step (X) is said to precede another step (Z), this does not imply that there is no step between steps (X) and (Z). That is, step (X) preceding step (Z) encompasses the situation that step (X) is performed directly before step (Z), but also the situation that (X) is performed before one or more steps (Y1), . . . , followed by step (Z). Corresponding considerations apply when terms like "after" or "before" are used.

While in the above, a preferred embodiment has been described with reference to the accompanying drawings, the skilled person will understand that this embodiment was provided for illustrative purpose only and should by no means be construed to limit the scope of the present invention, which is defined by the claims.

What is claimed is:

1. A method for determining a state of a fluidic system, the method comprising: measuring back pressures in the fluidic system at different times; and
    determining a state of the fluidic system, wherein the determination is based on at least the measured back pressures;
    wherein the step of determining a state of the fluidic system comprises comparing the measured back pressures to at least one reference;
    wherein the at least one reference is based on prior measurements of the back pressure.

2. Method according to claim 1, wherein the determining the state is also based on additional status information at at least one of the different times, and
    wherein the reference used in the comparison step depends on the additional status information.

3. The method according to claim 1, wherein the determining the state of the fluidic system further comprises:
    determining a deviation when an absolute value between one of the measured back pressure and at least one reference exceeds a threshold.

4. The method according to claim 3, wherein the fluidic system comprises a pump configured to generate a liquid flow,
    wherein the fluidic system is configured to assume different configurations, wherein the configurations differ at least as regards which components are fluidly connected to the pump;
    wherein the deviation is determined for the fluidic system in a first configuration, and
    wherein the method further comprises:
        the fluidic system assuming a second configuration, which is different from the first configuration, and determining whether the deviation occurs in the second configuration.

5. The method according to claim 2, wherein the fluidic system comprises a pump configured to generate a liquid flow,
    wherein the fluidic system is configured to assume different configurations,
    wherein the configurations differ at least as regards which components are fluidly connected to the pump; and
    wherein the additional status information comprises the configurations assumed by the fluidic system at the different times.

6. The method according to claim 2, wherein the additional status information comprises at least one of
    an information of components of the fluidic system;
    parameters of a procedure performed by the fluidic system; and
    environmental operating conditions occurring at at least one of the different times.

7. The method according to claim 1 further comprises:
    outputting an output information depending on the determined state of the fluidic system.

8. The method according to claim 1, wherein the fluidic system comprises:
    a data storage unit and wherein the method further comprises:
        storing at least one of the measured back pressures and the additional status information in the data storage unit.

9. The method according to claim 1, wherein the at least one reference is based on back pressures measured under conditions which are at least comparable to conditions at different times.

10. The method according to claim 9 wherein the fluidic system comprises:
    a data storage unit and wherein the data storage unit comprises the back pressures measured under the at least comparable conditions.

11. A method for determining a state of a fluidic system, the method comprising:
    measuring back pressures in the fluidic system at different times; and
    determining a state of the fluidic system, wherein the determination is based on at least the measured back pressures;
    wherein the step of determining a state of the fluidic system further comprises determining a deviation when an absolute value between a measured back pressure and at least one reference exceeds a threshold,
    wherein the deviation is determined for the fluidic system assuming a first configuration,
    and wherein the method further comprises
    the fluidic system assuming a second configuration corresponding to a different fluidic pathway than the first configuration, and determining whether the deviation occurs in this second configuration, and
    thus narrowing down possible causes for the deviation.

12. The method according to claim 11, wherein the determining the state is also based on an additional status information at at least one of the different times.

13. The method according to claim 11, wherein the at least one reference is based on the back pressures measured under conditions which are at least comparable to conditions at the different times.

14. The method according to claim 11, wherein the at least one reference used in the determining the deviation depends on the additional status information.

15. The method according to claim 11, wherein the fluidic system comprises a pump configured to generate a liquid flow,
    wherein the first configuration and the second configuration differ at least as regards which components are fluidly connected to the pump.

16. The method according to claim 15, wherein the additional status information comprises the configurations assumed by the fluidic system at the different times.

17. The method according to claim 12, wherein the additional status information comprises at least one of
an information of components of the fluidic system;
parameters of a procedure performed by the fluidic system; and
environmental operating conditions occurring at at least one of the different times.

18. The method according to claim 11 further comprises:
outputting an output information depending on the determined state of the fluidic system.

19. The method according to claim 11, wherein the fluidic system comprises:
a data storage unit and wherein the method further comprises:
storing at least one of the measured back pressures and the additional status information in the data storage unit.

20. The method according to claim 13 wherein the fluidic system comprises:
a data storage unit and wherein the data storage unit comprises the back pressures measured under the at least comparable conditions.

21. A liquid chromatography system comprising:
a pump configured to generate a liquid flow;
a switching valve configured to switch between different configurations, wherein different components are fluidly connected to the pump depending on a position of the switching valve;
a separation column;
a fluid connection between the pump and the separation column;
a data analysis unit configured to measure back pressures in the fluidic system at different times; and
determine a state of the liquid chromatography system based on at least the measured back pressures,
compare the measured back pressures to at least one reference to determine the state of the liquid chromatography system,
wherein the at least one reference is based on prior measurements of the back pressure.

22. The liquid chromatography system according to claim 21, wherein the data analysis unit is further configured to
determine the state of the liquid chromatography system based on at least the measured back pressures and on an additional status information at at least one of the different times.

23. A liquid chromatography system comprising:
a pump configured to generate a liquid flow;
a switching valve configured to switch between different configurations, wherein different components are fluidly connected to the pump depending on a position of the switching valve;
a separation column;
a fluid connection between the pump and the separation column;
wherein the system is configured to assume a first configuration and a second configuration corresponding to a different fluidic pathway than the first configuration;
the system further comprising a data analysis unit configured to measure back pressures in the fluidic system at different times; and
determine a state of the liquid chromatography system based on at least the measured back pressures, comprising
determining a deviation when an absolute value between a measured back pressure and at least one reference exceeds a threshold,
wherein the deviation is determined for the system assuming the first configuration, and
determining whether the deviation occurs in the second configuration, and
thus narrowing down possible causes for the deviation.

24. The liquid chromatography system according to claim 23, wherein the data analysis unit is further configured to
determine the state of the liquid chromatography system based on at least the measured back pressures and on an additional status information at at least one of the different times.

* * * * *

UNITED STATES PATENT AND TRADEMARK OFFICE
CERTIFICATE OF CORRECTION

PATENT NO. : 12,385,885 B2
APPLICATION NO. : 18/146491
DATED : August 12, 2025
INVENTOR(S) : Martin Rendl Page 1 of 1

It is certified that error appears in the above-identified patent and that said Letters Patent is hereby corrected as shown below:

On the Title Page

In Column 1, item (71), under Applicant, Line 2, delete "Gemering" and insert -- Germering --, therefor.

In Column 1, item (73), under Assignee, Line 1, delete "Gemering" and insert -- Germering --, therefor.

In the Claims

In Column 23, Claim 2, Line 39, delete "Method" and insert -- The method --, therefor.

In Column 24, Claim 6, Line 7, delete "of" and insert -- of: --, therefor.

In Column 24, Claim 11, Line 46, delete "comprises" and insert -- comprises: --, therefor.

In Column 25, Claim 17, Line 5, delete "of" and insert -- of: --, therefor.

In Column 26, Claim 22, Line 4, delete "to" and insert -- to: --, therefor.

In Column 26, Claim 23, Lines 25-26, delete "comprising" and insert -- comprising: --, therefor.

In Column 26, Claim 24, Line 36, delete "to" and insert -- to: --, therefor.

Signed and Sealed this
Seventh Day of October, 2025

John A. Squires
*Director of the United States Patent and Trademark Office*